April 21, 1936.   H. C. ANDERSON   2,037,749
DIRECT BONDING OF RUBBER AND METAL
Filed Dec. 27, 1934
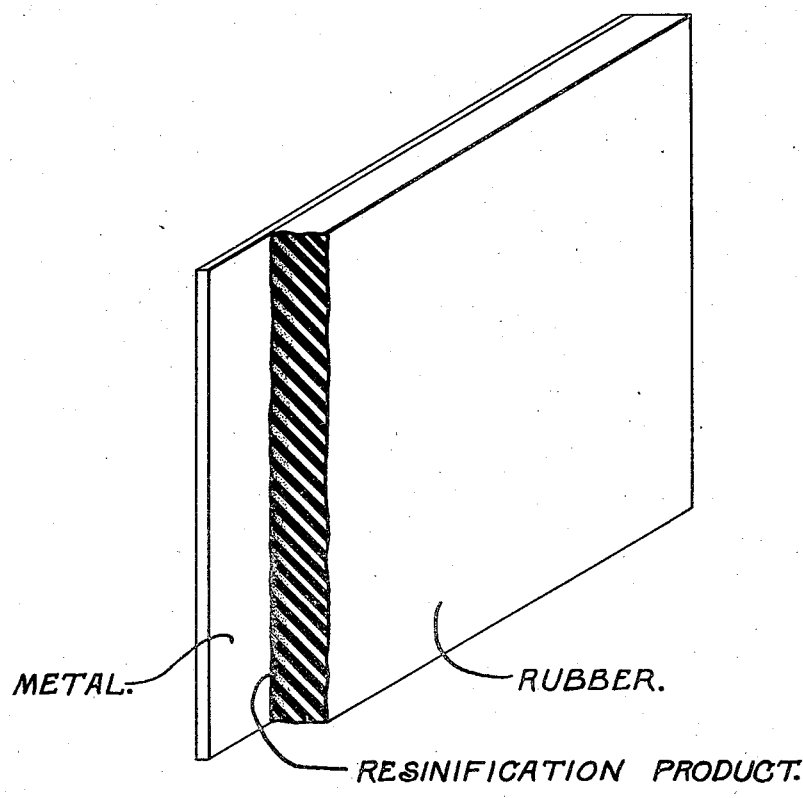
INVENTOR
HAL C. ANDERSON.

Patented Apr. 21, 1936

2,037,749

UNITED STATES PATENT OFFICE 2,037,749

DIRECT BONDING OF RUBBER AND METAL

Hal C. Anderson, Highland Park, Mich., assignor to Chrysler Corporation, Detroit, Mich., a corporation of Delaware Application December 27, 1934, Serial No. 759,383

6 Claims. (Cl. 91—68)

This invention relates to an improved composition for forming a direct bond between rubber and metal.

More specifically, my invention relates to direct bonding of rubber to ferrous metals.

Heretofore, it has been the practice to coat ferrous metal articles with brass, or other non-ferrous metals to which rubber can be vulcanized, before attempting to bond rubber thereto. In order to produce a secure or integral bond between the rubber and the metal coating, the vulcanization of the rubber has been conducted under pressure by a process not unlike that conventionally used in molding rubber articles from vulcanizable rubber. This process is not suitable for bonding rubber to many articles which are too large or wholly unadapted for the molding process in other structural characteristics such as strength and shape. The adhesion between rubber and metal produced by the use of dopes, such as semi-thermoplastic cements, has been found to be unsatisfactory for the reason that failure occurs at temperatures of substantially 150° F.

The main objects of my invention are to provide an improved vulcanizable rubber composition which bonds directly to ferrous metal during curing thereof; to provide a composition of this character which does not require the provision of brass or other non-ferrous metal coatings upon the surfaces of the articles to which it is to be secured; to provide bond forming ingredients in a rubber composition of this character which cause the composition to tenaciously adhere to ferrous metal surfaces after it has been cured or vulcanized, preferably by the application of heat while in intimate contact with such surfaces; and to provide suitable vulcanizing and accelerating agents in the vulcanizable rubber composition which are compatible with the bond forming ingredients and which do not in any way destroy their bond forming capacities.

Other objects of the invention are to provide an improved method for bonding rubber directly to ferrous metal and to provide an improved composite rubber and ferrous metal article having substantially integrally united component parts.

Although my improved method and composition are particularly adapted to facilitate the direct bonding of rubber to ferrous metal, both the method and composition may be used to advantage in obtaining a bond between rubber and any other metal.

The drawing illustrates diagrammatically, rubber bonded to metal with a resinification product produced by my invention.

My improved vulcanizable rubber composition is preferably provided with a bond forming ingredient selected from the organic rubber vulcanization accelerating compounds which have been classified as carbo-sulfhydryl polysulfide accelerators and, in which is included carbo-sulfhydryl sulfides and thiocarbamic acids, salts, esters and condensation products of thiocarbamic acids, salts and esters which either contain the group ≡C—SH, or undergo reactions which tend to produce this group. Such compounds have a marked capacity for vulcanizing rubber and accelerating the vulcanization thereof and have heretofore been used in relatively small proportions in conjunction with accelerators, such as zinc, lead and calcium inorganic compounds, which activate their vulcanizing and accelerating properties for the purposes of both supplying sulphur for the curing of rubber and accelerating the curing reaction.

I have found that when the above mentioned bond forming ingredients are incorporated in a vulcanizable rubber composition which is provided with vulcanizing and accelerating agents that do not activate the vulcanizing and accelerating properties of such ingredients or have more than a slight activating effect thereon, a secure bond is obtained between the rubber composition and metal by causing the rubber composition to cure while in intimate contact with the metal. The best explanation that can be given at this time of the chemical reaction which takes place is that when the vulcanizing and accelerating properties of the selected carbo-sulfhydryl sulfide are not activated, some of the latter resinifies while in contact with the metal, forming an infusible resinification product.

Any one of the following compounds, or combinations of two or more thereof, may be used as the bond forming ingredient of my improved vulcanizable rubber composition:

Tetramethylthiuramdisulfide
Tetraethylthiuramdisulfide
Tetramethylthiuramtetrasulfide
Tetramethylthiurammonosulfide
Dipentamethylenethiuramtetrasulfide
Piperidiniumpentamethylenedithiocarbamate
Zinc dimethyldithiocarbamate
Selenium dimethyldithiocarbamate
Selenium tetra-dimethyldithiocarbamate There are a vast number of primary accelerators which are capable of satisfactorily producing the desired reaction between rubber and sulphur, or other vulcanizing agents, and which do not activate the accelerating and vulcanizing properties of the above mentioned bond forming ingredients. I have found that metallic zinc dust may be used for this purpose either alone or in selected combinations with other primary accelerators such as mercaptobenzothiazole or any of the following combinations of organic accelerators.

1. Zinc butyl xanthate
Aldehydeamine

2. Zinc dimethyldithiocarbamate
   Aldehydeamine
3. Piperidiniumpentamethylenedithio-
   carbamate
   Aldehydeamine
4. Zinc dimethyldithiocarbamate
   Mercaptobenzothiazole
5. Magnesium oxide      MgO
6. Magnesium hydroxide  Mg(OH)$_2$
7. Magnesium carbonate  MgCO$_3$
8. Magnesium silicate   MgSiO$_3$
9. Sodium zincate (probable formula Na$_2$ZnO$_2$ actually made by dissolving zinc oxide and sodium hydroxide)

For the purpose of lining tanks or securing rubber to ferrous metal articles which, by reason of their structural characteristics, such as size, shape and strength, are not adapted for the application of pressure, the following rubber composition is recommended:

| | Parts by weight |
|---|---|
| Rubber | 100 |
| Zinc dust | 3 |
| Phenylbetanaphthylamine | 1 |
| Stearic acid | 2 |
| Tetramethylthiuramdisulfide (or any of the above bond forming ingredients) | 5 |
| Sulphur | 3 |

Zinc dust may be relied upon as the only primary accelerator or it may be used in combination with any of the organic primary accelerators heretofore set forth which do not activate the accelerating and vulcanizing properties of the bond forming ingredient.

The ingredients of the above formula are preferably thoroughly mixed in a mill using "pale crepe" as the rubber component and the resulting mass is then calendered to the desired thickness. Layers of this unvulcanized rubber composition are applied directly to the desired surfaces of the ferrous metal which have been preferably sand blasted or cleaned in any suitable manner. Then the article to which the composition has been applied is placed in a chamber to which steam, or other suitable heating medium, is admitted for the purpose of subjecting the rubber to a temperature of substantially 300° F. to 320° F. This heat treatment causes a curing reaction between the rubber and sulphur and simultaneously forms a bond between the ferrous metal and the rubber composition. The phenylbetanaphthylamine serves as an anti-oxidant or preservative and the stearic acid serves as a softener. Vulcanizing compounds having the following compositions may be simultaneously cured and bonded to ferrous metal by heating it to from substantially 300° F. to 325° F. in the presence of air, as, for example, in a suitable oven or in open heating apparatus.

| | Parts by weight |
|---|---|
| Rubber | 100 |
| Zinc dust | 3 |
| Zinc dimethyldithiocarbamate | 2 |
| Phenylbetanaphthylamine | 1 |
| Stearic acid | 2 |
| Tetramethylthiuramdisulfide (or any of the above bond forming ingredients) | 5 |
| Sulphur | 3 |

The above air curing composition is compounded in the same manner as the steam curing composition and in this instance zinc dust may be used alone or in combination with any primary accelerator which does not activate the accelerating and vulcanizing properties of the bond forming ingredient.

When it is desired to bond rubber to ferrous metal during a conventional molding process in which both heat and pressure are applied, the rubber compound is preferably provided with any of the following compositions:

| | Parts by weight |
|---|---|
| Crepe rubber | 1000 |
| Zinc dust | 30 |
| Magnesium hydroxide | 0–1000 |
| Channel carbon black | 0–500 |
| Mercapto-benzo-thiazole | 8 |
| Stearic acid | 0–50 |
| Phenylbetanaphthylamine | 10 |
| Tetramethylthiuramdisulfide | 50 |
| Sulfur | 30 |
| Magnesium silicate | 0–50 |
| Sodium zincate | 0–50 |

| | Parts by weight |
|---|---|
| Crepe rubber | 1000 |
| Zinc dust | 30 |
| Magnesium carbonate | 0–1000 |
| Channel carbon black | 0–500 |
| Mercaptobenzothiazole | 8 |
| Stearic acid | 0–50 |
| Phenylbetathiazole | 10 |
| Tetramethylthiuramdisulfide | 50 |
| Sulfur | 30 |
| Magnesium silicate | 30 |
| Sodium zincate | 0–50 |

| | Parts by weight |
|---|---|
| Crepe rubber | 1000 |
| Zinc dust | 30 |
| Magnesium oxide | 0–1000 |
| Channel carbon black | 0–500 |
| Mercaptobenzothiazole | 8 |
| Stearic acid | 0–50 |
| Phenylbetanaphthylamine | 10 |
| Tetramethylthiuramdisulfide | 50 |
| Sulfur | 30 |
| Magnesium silicate | 0–50 |
| Sodium zincate | 0–50 |
| Manganese dioxide | 0–10 |

Zinc dust may be used alone in these press curing compositions or as illustrated in the formulæ in combination with any of the primary accelerators which do not activate or accelerate the accelerating and vulcanizing properties in the bond forming ingredients.

The manganese dioxide included in one of the compositions, serves as an oxidizing agent and it is believed to assist in the resinification of the bonding ingredients during heating of the combination while in contact with ferrous metal. The carbon black serves as a reinforcing pigment.

A composite rubber and ferrous metal article formed in accordance with the improved method appears in cross-section to have an intermediate film resembling a resinification product which tenaciously adheres to the ferrous metal and which is intimately incorporated with the rubber layer in a decreasing concentration from a maximum concentration at the side adjacent the ferrous metal.

The physical and chemical properties of the rubber layer may be controlled by the addition of any of the well-known loading or modifying ingredients which are conventionally used in rubber compositions for diverse purposes, so long as the materials added are such that they do not activate the vulcanizing and accelerating properties of the bond forming ingredient.

Although but several specific embodiments of my invention are herein set forth, it is understood that various changes in the materials employed and in the temperatures and periods of heating may be made without departing from the spirit of my invention, and it is not my intention to limit its scope other than by the terms of the appended claims.

What I claim is:

1. A vulcanizable rubber composition adapted to bond directly to metal upon curing while in intimate contact therewith including rubber, a bond forming ingredient selected from the carbo-sulfhydryl polysulfide class of organic vulcanization accelerators, and a vulcanizing accelerating component including zinc dust and having substantially to activating effect upon the vulcanizing and accelerating properties of said bond forming ingredient, said vulcanizable rubber compound being substantially free from ingredients having an activating effect upon the vulcanizing and accelerating properties of said bond forming ingredient.

2. A vulcanizable rubber composition adapted to bond directly to metal upon curing while in intimate contact therewith including rubber, a vulcanizing agent, a bond forming ingredient including a tetramethylthiuram sulfide, and a vulcanizing accelerating component including zinc dust and having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

3. A vulcanizable rubber composition adapted to bond directly to metal upon curing while in intimate contact therewith including rubber, a vulcanizing agent, a bond forming ingredient including a tetraethylthiuram sulfide, and a vulcanizing accelerating component including zinc dust and having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

4. A vulcanizable rubber composition adapted to bond directly to ferrous metal upon heating while in intimate contact therewith including rubber, a vulcanizing agent, a bond forming ingredient comprising a thiuram sulphide, and a vulcanization accelerating component including zinc dust and having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

5. A vulcanizable rubber composition adapted to bond directly to ferrous metal upon heating while in intimate contact therewith including rubber, a bond forming ingredient selected from the carbo-sulfhydryl polysulfide class of organic vulcanization accelerators, a vulcanizing agent and a vulcanization accelerating component comprising zinc dust and having substantially not more than a slight activating effect upon the vulcanizing and accelerating properties of said bond forming ingredient as compared with inorganic zinc, lead and calcium activating compounds.

6. A vulcanizable rubber composition adapted to bond directly to ferrous metal upon heating while in intimate contact therewith including rubber, a vulcanizing agent, an oxidizing agent, the bond forming ingredient selected from the carbosulfhydryl polysulfide class of organic vulcanization accelerators, and a vulcanizing accelerating component including zinc dust, and an organic accelerating compound or compounds having substantially no activating effect upon the vulcanizing and accelerating properties of said bond forming ingredient, said vulcanizable rubber composition being substantially free from ingredients having an activating effect upon the vulcanizing and accelerating properties of said bond forming ingredient.

HAL C. ANDERSON.

CERTIFICATE OF CORRECTION.

Patent No. 2,037,749.

April 21, 1936.

HAL C. ANDERSON.

It is hereby certified that error appears in the printed specification of the above numbered patent requiring correction as follows: Page 3, first column, line 17, claim 1, for "to" read no; and that the said Letters Patent should be read with this correction therein that the same may conform to the record of the case in the Patent Office.

Signed and sealed this 4th day of August, A. D. 1936.

Henry Van Arsdale (Seal)

Acting Commissioner of Patents.